Jan. 23, 1945.   R. N. DICKEY   2,367,847
HINGE CONSTRUCTION FOR WAFFLE IRONS AND THE LIKE
Original Filed May 16, 1940   2 Sheets-Sheet 1
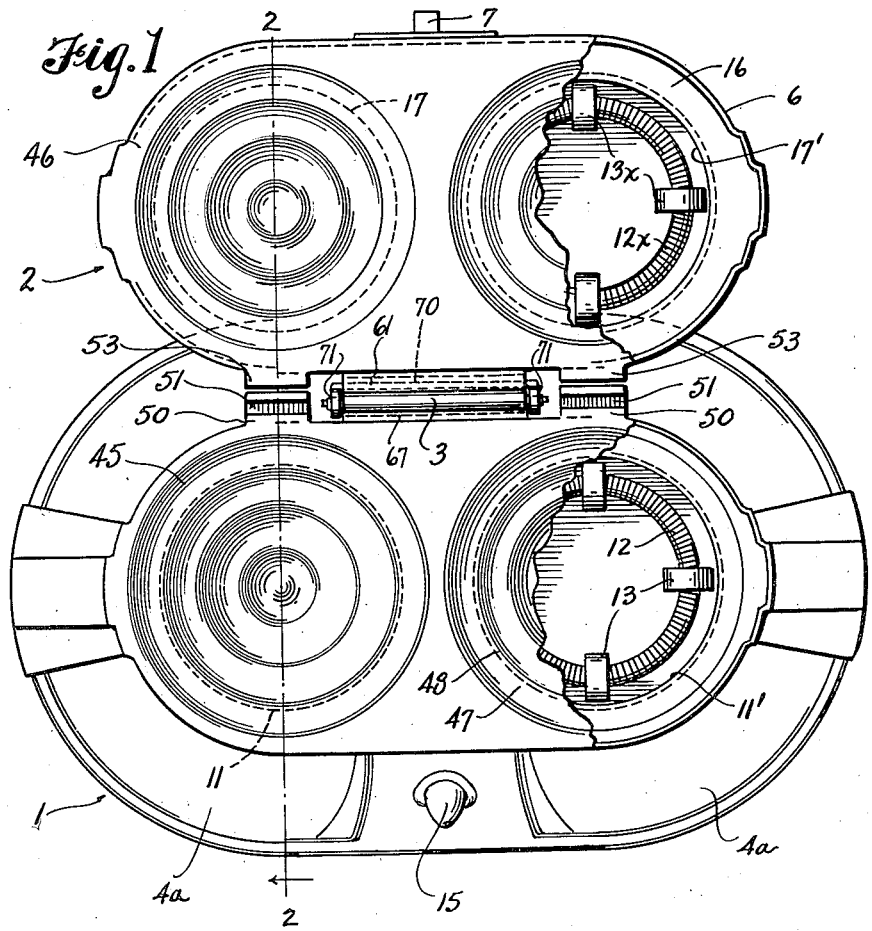
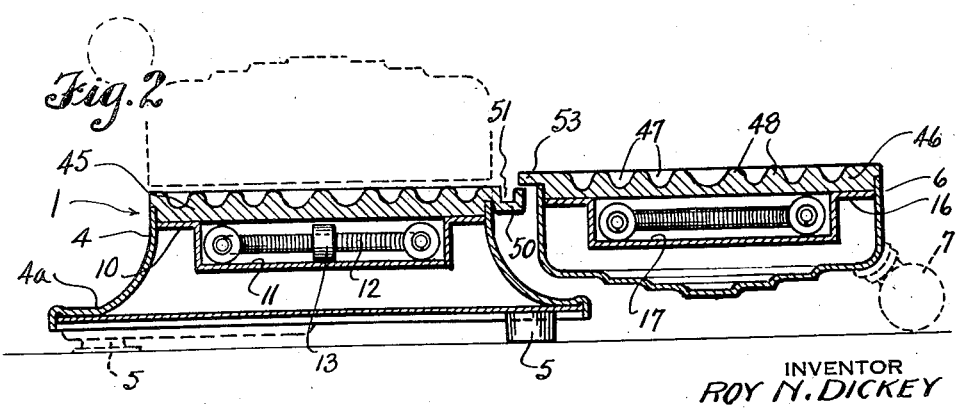
INVENTOR
ROY N. DICKEY
BY
Cook & Robinson
ATTORNEY Jan. 23, 1945. R. N. DICKEY 2,367,847
HINGE CONSTRUCTION FOR WAFFLE IRONS AND THE LIKE
Original Filed May 16, 1940 2 Sheets—Sheet 2
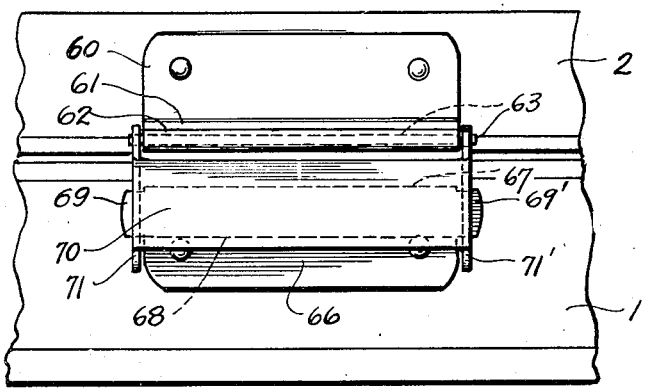
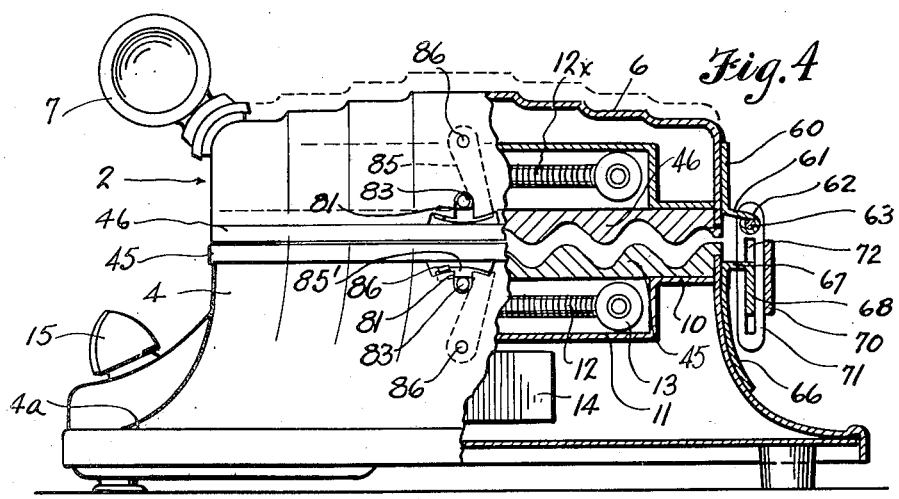
INVENTOR
Roy N. Dickey
BY Cook & Robinson
ATTORNEY Patented Jan. 23, 1945

2,367,847

UNITED STATES PATENT OFFICE 2,367,847

HINGE CONSTRUCTION FOR WAFFLE IRONS AND THE LIKE

Roy N. Dickey, Seattle, Wash., assignor to Meets-A-Need Manufacturing Company, Seattle, Wash., a corporation of Washington Original application May 16, 1940, Serial No. 335,539, now Patent No. 2,314,872, dated March 30, 1943. Divided and this application January 26, 1942, Serial No. 428,202

2 Claims. (Cl. 16—179)

This invention relates to electrically heated utensils for the cooking of hotcakes and waffles, and has reference more particularly to improvements in cooking utensils of that character illustrated and described in U. S. Letters Patent No. 1,907,441, issued May 9, 1933, to John Campbell and Clarence H. Pickering; the present improvement being in the provision of means for adapting utensils of the character described in the above patent for the cooking of waffles. The present application is a divisional part of my copending application filed on May 16, 1940, under Serial No. 335,539, and which has matured into Patent No. 2,314,872 of March 30, 1943.

More specifically stated, the present invention has to do with certain improvements in the design and construction of a self-adjusting hinge for the attachment of the top section to the bottom or base section to permit that relative spreading movement that is desirable due to the expanding of the waffle batter while being cooked between the complemental sections, and which also permits the interchangeable use of waffle cooking plates and those for cooking hotcakes and the cake turning device, as disclosed in the above mentioned patent, without interference with or requiring any readjusting or detachment of the hinge parts incident to a change of plates.

Another object of the invention resides in the provision of means on the waffle plates whereby the hinged top section of the utensil may be held in open position.

Other objects of the invention reside in the details of construction and combination of parts, as will hereinafter be fully described.

In accomplishing these and other objects of the invention, I have provided the improved details of construction, the preferred forms of which are illustrated in the accompanying drawings wherein—

Fig. 1 is a plan view of the present utensil shown in open position, and as equipped with waffle molds.

Fig. 2 is a cross sectional view of the utensil on line 2—2 in Fig. 1.

Fig. 3 is a partial rear view of the utensil, with the cover section in closed position, and particularly illustrating the hinge structure whereby the top section is connected with the base section.

Fig. 4 is a partial end view, and partial cross-sectional view of the utensil as equipped with plates for the cooking of waffles and showing the top section closed; also illustrating the hinge connection of the top and bottom sections of the utensil to accommodate waffle expansion.

Fig. 5 is a detail illustrating the cooperating parts provided on the complemental waffle plates whereby the hingedly attached top section of the utensil may be supported in its raised position.

Fig. 6 is a detail showing the latch devices as used for engaging studs of a cooking plate to secure it in position in its housing.

The present device is designed somewhat in accordance with the device of the previously mentioned patent. However, it is to be explained that while the device of the patent comprises electrically heated, and hingedly attached complemental sections adapted to be opened apart to provide two horizontal cooking surfaces, and cake molds are provided and usable for transferring of hotcakes from one surface to the other and for turning them over incident to their transfer, the patent does not contemplate, nor is it adapted to the interchangeable use of plates for the baking of waffles or hotcakes, and could not, as designed, be used for waffles, due to the character of the plates and the type of hinge connection used.

Referring more in detail to the drawings—

In its present preferred form of construction, the cooking utensil as embodied by this invention comprises complemental base and top sections; the former being designated in its entirety by reference numeral 1, and the latter section being designated in its entirety by reference numeral 2. These two sections are connected by a hinge structure, designated generally at 3, and presently described in detail, which permits the top section to be swung upwardly about a horizontal axis, from its closed position resting flatly upon the base, as seen in Fig. 4, to open position in which it is shown in Figs. 1 and 2, thus to provide two horizontal heating surfaces lying substantially in the same plane for the cooking of hot cakes, as described in the copending application of which this is a divisional part.

In the present instance, the base section 1 comprises an enclosing housing 4 of metal and of oval outline, formed with a flaring skirt, or base portion 4a, and this is equipped with suitable legs 5 whereby to sustain the device spaced somewhat above any supporting surface on which it might be placed.

The top section 2 of the device comprises a formed housing 6 of metal, corresponding in outline to the upper portion of the base section, and provided at the side opposite the hinge connection with a knob, or handle 7, which serves as a convenient means whereby the top section may be swung about the hinge axis between open and closed positions, and also, when the device is in open position, serves as a supporting leg to engage the table top or other surface on which the utensil is placed, to support the heating plates mounted by the two sections, in the same plane, as will be understood by reference to Fig. 2.

Set down somewhat within the top edge of the base housing, is a horizontal plate 10 having two circular basins 11 and 11' formed therein, and in each of these basins there is contained an electrical heating element 12 carried in insulating spools 13 which are suitably fixed to the plate. These elements have electrical connection through means contained within the base housing, with circuit wires leading through a thermostatic switch, designated at 14 in Fig. 4, to a suitable supply of current. In this instance, the flow of current is under control of a switch adjusting knob 15 at the front of the housing.

Fitted in the open side of the housing 6 of the top section 2, as noted in Fig. 2, is a plate 16, and this is formed with two, circular depressions or basins 17 and 17', in the positions as indicated in dotted lines in Fig. 1. These latter basins, 17—17', are of the same size as those formed in the plate 10 of the base section, and when the top section of the utensil is closed over the bottom section, as in Fig. 4, the basins therein and basins 11 and 11' of plate 10, will be substantially in vertical alinement. The basins 17—17' also are equipped with heating elements, designated at 12x, supported by insulators 13x, and these elements are also connected to the supply circuit through switch 14 under control of switch knob 15.

It is to be observed by reference to Figs. 2 and 4 that the plates 10 and 16 are set down within the open side of their respective housings 4 and 6 to provide space for the reception of the interchangeable plates for cake or waffle baking.

It will be explained that the utensil as herein illustrated is equipped with plates for the cooking of waffles. The waffle plates are shown best in Fig. 1, and are designated respectively by reference characters 45 and 46; the plate 45 being the bottom plate and is to be applied to the base section 1 while plate 46 is the top plate and is applied to the top section 2.

The present waffle plates are designed for baking two waffles at a time, and each is therefore formed with two molds, each mold comprising, in the top and bottom plates, a succession of alternating, concentrically arranged grooves and ridges, as designated at 47 and 48, which, in closing of the sections of the utensil together, will be brought into coacting relationship, as understood by the sectional portion of Fig. 4; it being noted that the ridge portions of one plate coincide with the groove portions of the complemental plate when the sections of the utensil are closed as for the baking of a waffle between them.

When the waffle plates are applied, they closely overlie the plates 10 and 14, and the contained heating elements 12 and 12x are uniformly heated over their entire surfaces.

In order that the top section of the utensil may be supported in an open position when such is desired, the plate 45 is provided at the hinge side with laterally extending lugs 50, formed with square cut, vertical, walled channels 51 in alinement, and the plate 46 is formed at the adjacent edge with lateral wings 53, adapted, when the plate 46 has been swung substantially to a vertical plane, to be received in the channels 51, thus to support the top section in an upright position, and just slightly inclined toward the open position, as noted by reference to Fig. 5. When it is desired to seat the wings 53 in the lug channels, the section 2 is merely swung to upright position, through its hinge connections, then slightly lifted to permit the wings to be received in the slots, then is lowered to the position as shown in Fig. 5. It will later be understood that the hinge connection 3 provides for the movement. To unseat the wings, the section is lifted slightly, then it may be swung to closed position.

The hinge structure 3 whereby the two sections of the utensil are joined, is illustrated best in Figs. 3 and 4, and it comprises the following parts: Fixed on the back wall of the housing 6 is a hinge plate 60 having a rearwardly directed flange 61 along its lower edge terminating in a cylindrical curl 62 in which a hinge pin 63 is contained, with its ends extending slightly beyond the ends of the flange.

Likewise, fixed on the back wall of housing 4 is a hinge plate 66 having an out-turned flange 67 along its top edge, and this is formed with a vertically, downturned plate 68, with opposite end extensions 69 and 69' which lie in vertical planes.

Disposed in a plane parallel with and lying outside of the plate 68, as seen in Fig. 4, is a flat plate 70 with inturned flanges or wings 71 and 71' at its opposite ends. At their upper ends, these wings, respectively, are pivoted on the opposite ends of the hinge pin 63, and formed in the wings lengthwise thereof, are vertical slots 72 which slidably contain the extension portions 69 and 69' of the plate 68 therein. These slots are longer than the height of the extension portions 69 and 69' and therefore the plate 70 may be raised or lowered to the extent permitted by the limits of the slots 72, and this movement is such as required for the usual expansion of waffle batter during a cooking operation. However, the hinging action provided by the connection of pin 63 with the upper ends of the wings 71—71' retains the section 2 in proper relationship to section 1.

Now, describing the latch devices for securement of the waffle mold plates 45 and 46 in their respective housings:

The housings 4 and 6 are each provided, in one of its end walls, with a hole 80, and at the other end with a notch 81 opening to the edge of the housing in which the cooking plate is to be received, as will be understood by reference to Figs. 4 and 6, and each of the plates 45 and 46 for the cooking of waffles, is provided at one end with a short stud 82 adapted, upon seating the plate in its housing, to be recessed in the corresponding holes 80. At their other ends, the plates are provided with short studs 83 adapted to be received in the corresponding notches 81. Mounted on the inside of the end walls of the housings 4 and 6, adjacent the notches 81, are latch hooks 85 secured by pivots 86. Each latch has a hook end 85' adapted to be swung to position to engage the corresponding plate stud 83 to hold that end of the plate from being unseated from its housing, as will be best understood by reference to Fig. 4. Each latch has an outwardly extending leg 86 bent out from the hook end and exposed at the outside of the housing for moving the hook to and from holding contact with the plate stud. To remove a plate, it is only necessary to release the end hook, lift that end of the plate clear of the housing, then withdraw the opposite end stud from the housing.

The present hinge structure, designated in its entirety by numeral 3, is important as it provides that the two sections 1 and 2 be permanently joined in a hinged connection which accommodates the utensil to expansion that is incident to cooking of batter therein, and at the same time accommodates the device to the interchangeable use of cake and waffle molds without necessitating disconnection of the hinge.

Having thus described my invention, what I claim as new therein and desire to secure by Letters Patent is:

1. A self-adjusting hinge connecting a bottom section and a top section, comprising a bracket that is fixed to the top section, a hinge pin of substantial length mounted horizontally in the bracket, a second bracket fixed to the bottom section below and spaced from the first mentioned bracket and having flat extension portions at its opposite sides lying in a vertical plane, and a connecting plate extended horizontally along the brackets and having laterally turned vertical flanges at its ends mounting the hinge pin therein and formed with vertical slots containing the said extension portions of the second mentioned bracket therein, providing guided vertical movement of the plate in the adjustment of the hinge.

2. A self-adjusting hinge connecting a bottom section and a top section, comprising a bracket that is rigidly fixed to the top section, a hinge pin of substantial length mounted horizontally in the bracket with its ends extended therebeyond, a second bracket rigidly fixed to the bottom section, below and spaced from the first mentioned bracket and including flat extension portions at its opposite sides lying in the same vertical plane, and a connecting plate extended horizontally along the brackets and having laterally turned vertical flanges at its ends lying in planes that are perpendicular to the plate and to the axial line of the hinge pin; said flanges mounting the opposite ends of the hinge pin therein adjacent the top edge of the plate and having vertical, elongated slots containing the said flat extensions of the second bracket thereon, and providing guided vertical movement of the plate in the adjustment of the hinge.

ROY N. DICKEY.